(12) United States Patent
Dallas et al.

(10) Patent No.: US 6,603,908 B2
(45) Date of Patent: Aug. 5, 2003

(54) BUFFER TUBE THAT RESULTS IN EASY ACCESS TO AND LOW ATTENUATION OF FIBERS DISPOSED WITHIN BUFFER TUBE

(75) Inventors: George John Dallas, Hickory, NC (US); Jeff Barker, Statesville, NC (US); Goeff Witt, Claremont, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/892,467

(22) Filed: Jun. 28, 2001

(65) Prior Publication Data

US 2003/0095763 A1 May 22, 2003

Related U.S. Application Data

(60) Provisional application No. 60/222,923, filed on Aug. 4, 2000.

(51) Int. Cl.[7] .................................................. G02B 6/44
(52) U.S. Cl. ....................... 385/109; 385/100; 385/104; 385/105; 385/106; 385/107; 385/112; 385/113
(58) Field of Search ............................... 385/100, 104, 385/105, 106, 109, 111, 112, 113, 114, 107

(56) References Cited

U.S. PATENT DOCUMENTS

| | | | |
|---|---|---|---|
| 4,456,331 A | 6/1984 | Whitehead et al. | 385/100 X |
| 4,707,074 A | 11/1987 | Heywood | 385/109 X |
| 4,729,628 A | 3/1988 | Kraft et al. | 385/101 X |
| 4,815,814 A | 3/1989 | Ulijasz | 385/114 X |
| 4,909,593 A | 3/1990 | Harbort et al. | 385/109 X |
| 5,067,830 A | 11/1991 | McAlpine et al. | 385/114 X |
| 5,140,751 A | 8/1992 | Faust | 30/91.1 |
| 5,172,620 A | 12/1992 | Faust | 83/13 |
| 5,684,910 A * | 11/1997 | Chapin et al. | 385/128 |
| 5,970,196 A | 10/1999 | Greveling et al. | 385/114 X |
| 5,982,965 A * | 11/1999 | Cheron et al. | 385/100 |
| 6,208,785 B1 * | 3/2001 | Ishikawa et al. | 385/100 |
| 6,374,023 B1 * | 4/2002 | Parris | 385/100 |
| 6,411,403 B1 * | 6/2002 | Siddhamalli | 385/110 |

* cited by examiner

*Primary Examiner*—Brian Healy
(74) *Attorney, Agent, or Firm*—Sughrue Mion, PLLC

(57) ABSTRACT

A buffer tube design that allows easy access to signal carrying fibers disposed within the buffer tube with risk of damaging the signal carrying fibers. The buffer tube can be made with a ripcord disposed within. Additionally, the buffer tube has the mechanical properties that allow the ripcord to be pulled through the tube wall with less energy than is required to bend the signal carrying fibers within. The buffer tube can also be designed without a ripcord in such a way that the mechanical properties allow the tube to be hand torn using a lower amount of energy than required to bend the signal carrying fibers within.

46 Claims, 15 Drawing Sheets

| | DISPLACEMENT AT OFFSET YIELD 1 (in) | ENERGY TO YIELD POINT (lbf-in) | % STRAIN AT BREAK (%) | DISPLACEMENT @ MAX. I.D. (in) | LOAD AT MAXIMUM (lbf) | ENERGY IN BREAK POINT (lbf-in) |
|---|---|---|---|---|---|---|
| 1 | 0.236 | 0.110 | 25.972 | 2.637 | 4.446 | 5.508 |
| 2 | 0.235 | 0.102 | 25.569 | 2.577 | 4.438 | 5.085 |
| 3 | 0.200 | 0.091 | 26.600 | 2.680 | 4.459 | 5.376 |
| 4 | 0.222 | 0.104 | 27.219 | 2.761 | 4.615 | 6.015 |
| 5 | 0.260 | 0.116 | 26.913 | 2.720 | 4.370 | 5.280 |
| 6 | 0.234 | 0.106 | 26.840 | 2.714 | 4.507 | 5.385 |
| 7 | 0.251 | 0.113 | 29.282 | 2.947 | 4.676 | 6.153 |
| MEAN | 0.234 | 0.106 | 26.914 | 2.719 | 4.502 | 5.543 |
| S.D. | 0.019 | 0.008 | 1.190 | 0.117 | 0.108 | 0.393 |

FIG. 5

| | LOAD AT Z-SIP YIELD (kN) | STRESS AT Z-SIP YIELD (MPa) | % STRAIN AT Z-SIP YIELD (%) | LOAD AT MAX. LOAD (N) | STRESS AT MAX. LOAD (MPa) | % STRAIN AT MAX. LOAD (%) | % STRAIN AT AUTO. BREAK (%) | STRESS AT AUTO. BREAK (MPa) | LOAD AT AUTO. BREAK (N) |
|---|---|---|---|---|---|---|---|---|---|
| 1 | 0.005 | 9.309 | 7.383 | 10.240 | 17.667 | 744.099 | 744.099 | 17.667 | 10.240 |
| 2 | 0.005 | 9.055 | 6.928 | 10.280 | 17.736 | 698.270 | 697.970 | 17.736 | 10.280 |
| *EXCLUDED* | 0.006 | 9.726 | 7.662 | 10.560 | 18.219 | 665.872 | 667.272 | 18.150 | 10.520 |
| 4 | 0.005 | 9.402 | 10.517 | 9.450 | 16.304 | 612.862 | 613.661 | 16.257 | 9.423 |
| 5 | 0.005 | 9.333 | 8.275 | 9.866 | 17.021 | 647.892 | 648.092 | 16.997 | 9.852 |
| MEAN | 0.005 | 9.275 | 8.276 | 9.959 | 17.182 | 675.781 | 675.956 | 17.164 | 9.949 |
| S.D. | 0.000 | 0.152 | 1.596 | 0.387 | 0.668 | 57.474 | 57.111 | 0.690 | 0.400 |
| MINIMUM | 0.005 | 9.055 | 6.928 | 9.450 | 16.304 | 612.862 | 613.661 | 16.257 | 9.423 |
| MAXIMUM | 0.005 | 9.402 | 10.517 | 10.280 | 17.736 | 744.099 | 744.099 | 17.736 | 10.280 |

| | MAXIMUM PERCENT STRAIN (%) |
|---|---|
| 1 | 744.132 |
| 2 | 708.698 |
| *EXCLUDED* | 667.258 |
| 4 | 616.610 |
| 5 | 651.602 |
| MEAN | 680.261 |
| S.D. | 57.041 |
| MINIMUM | 616.610 |
| MAXIMUM | 744.132 |

FIG. 8

BUFFER TUBE THAT RESULTS IN EASY ACCESS TO AND LOW ATTENUATION OF FIBERS DISPOSED WITHIN BUFFER TUBE

CROSS REFERENCE TO RELATED APPLICATIONS

This application is based on provisional application number 60/222,923 filed on Aug. 4, 2000 and incorporates herein by reference all subject matter disclosed therein.

FIELD OF INVENTION

Typically access tools, such as a ring cut and slitter tools, are used to open buffer tubes in order to work on fibers disposed within a buffer tube also containing signal-carrying fibers. Tearing the buffer tube with a fingernail is also a technique used to gain access to the fiber. With these techniques, there is a risk that during access, the tool or fingernail will perturb and cause attenuation to signals carried in live fibers or cause damage to the fiber coating. Such attenuation is on the order of 0.5 dB and higher. An additional concern is that during removal of the buffer tube, the ring cut or breaking away of the buffer tube, a fiber will become damaged or will break.

DESCRIPTION OF RELATED ART

In order to mitigate the risk of damage to optical fibers during the process of buffer tube tearing and removal, several patents have included concepts of including a ripcord filament within the tube, or using specialized tools to slice open a section of the buffer tube. The rip filament may be embedded in the buffer tube or encased in the buffer tube and is discussed in an Alcatel patent by Harbort entitled "Optical Cable having at Least Two Separate Multiple-Fiber units each having its own Soft Plastic Envelope," U.S. Pat. No. 4,909,593. The following patents discuss different access tools used to slice sections of the buffer tube. These include "Monotube Optical Fiber Cable and Method of using the Same," U.S. Pat. No. 5,172,620, "Monotube Cable Fiber Access Tool," U.S. Pat. No. 5,140,751 and "Method and Tool for Accessing Optical Fibers Within a Buffer Tube," U.S. Pat. No. 5,577,150. However, in these patents, access tools are required to both initiate and propagate the tear in the buffer tube using a blade. Therefore, the risk of fiber damage or breakage and signal attenuation is not adequately addressed.

The above references also do not describe concepts on the correct fracture mechanics to make the rip system stable. An example of a conventional rip system is illustrated in FIG. 2. As shown, a ripcord is being manipulated to tear through a buffer tube. In this case, a notch cannot be initiated in the buffer tube using the ripcord. The force required to create a notch with the ripcord is greater than the force to buckle the buffer tube. The rip system is clearly unstable as indicated by the significant curling and buckling of the fiber bundle on the right-hand side of FIG. 1. This deformation of the fiber bundle contributes to the optical fiber damage and signal attenuation. As additional energy is applied in attempt to pull the ripcord through the buffer tube, the degree of buckling increases. Power loss measurements for the signal carried on an optical fiber disposed within the buffer tube of the conventional system are shown in FIG. 3.

SUMMARY OF THE INVENTION

The present invention overcomes the above deficiencies of known buffer tubes and access techniques by providing a variety buffer tube designs that are strong enough to house fiber bundles together yet permits the fibers disposed within the tube to be accessed easily with minimal attenuation. The present buffer tube designs further mitigate the risk of fiber breakage, because no sharp cutting implements need to be used. In particular, the buffer tubes of the present invention are constructed from materials having an appropriate ratio between the energy needed to deform the buffer tube versus the energy needed to tear the buffer tube, with or without a ripcord, and how this relates to reduced attenuation.

A primary feature of the invention comprises a ripcord disposed interior to the buffer tube or embedded in its wall. If a primary access method is used to open the buffer tube, the ripcord can be handled and used to promote a controlled tear in the buffer tube to allow access to several feet of fiber. The fracture energies of the buffer tube are selected so that the energy to pull the ripcord through the tube wall is less than the energy to bend the buffer tube bundle. The energy to yield of the ripcord should be greater than the energy to rip the ripcord through the buffer tube so that the ripcord does not break while attempting to remove the buffer tube.

A second feature of the invention comprises a buffer tube with mechanical properties such that its energy to initiate a tear (e.g. energy to break) and propagate a tear are less than the energy needed to deform a fiber bundle. This reduces the chance of excessive attenuation to signals carried in the optical fibers. In this aspect of the invention, no primary access tools are required to initiate the tear in the buffer tube due to mechanical and material properties of the buffer tube. In this embodiment, the ripcord need not be provided to propagate a tear.

A third feature of the invention comprises a buffer tube with stress risers in the tube walls that promote a controlled fracture. The energy to fracture the buffer tube wall is low enough so that the fibers can be easily accessed or even lower such that it does not perturb the fiber bundle and does not cause significant attenuation to live fibers. The stress risers can be in the longitudinal direction parallel to the lay of the optic fibers, perpendicular to the fiber direction or in a spiral pattern. The stress risers can be either continually or intermittently formed in the buffer tube.

DESCRIPTION OF DRAWINGS

Preferred embodiments of the invention are described below in reference to the attached Figures where

FIG. 5 is a table showing the energy, strain and loading characteristics for a ripcord used in an embodiment of the present invention;

FIG. 8 is a table showing the stress, energy, and loading characteristics for a buffer tube according to an embodiment of the present invention;

DESCRIPTION OF PREFERRED EMBODIMENTS

Figure 4A:
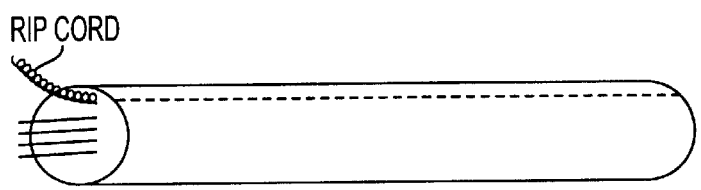
FIGS. 4(a)–4(b) illustrate an embodiment of the invention including a ripcord disposed within a buffer tube.
Figure 4B:
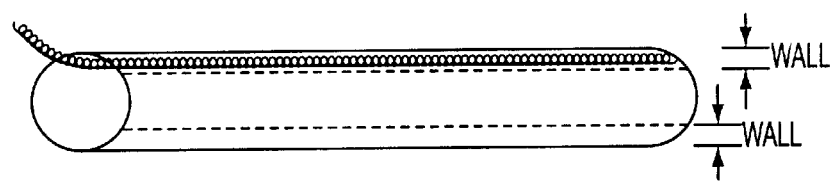

As previously discussed, existing optical fiber access methods use various slitting tools to open the buffer tubes to access several of the fibers in a multiple fiber bundle. Aside from requiring specialized tools, such methods of access potentially attenuate signals on the fibers or may cause damage or breakage. As a first feature of the invention, a ripcord fiber or strands of fibers are laid parallel to the optical fiber bundle. The ripcord may be disposed Hi interior to the buffer tube as shown in FIG. 4(a) or embedded in the tube wall as shown in FIG. 4(b). The ripcord(s) can be color coded or otherwise marked or banded to distinguish it from other components of the fiber bundle, such as the optical fibers. Once an initial access method is used to open the buffer tube, the ripcord fiber(s) can be used to open any desired length of the buffer tube with minimal deformation of the optical fiber bundle. This will occur if the following fracture mechanics criteria is met, that the energy to break the ripcord through the buffer tube or energy necessary to initiate and propagate a tear in the buffer tube is less than that needed to buckle the fiber bundle.

Figure 1:
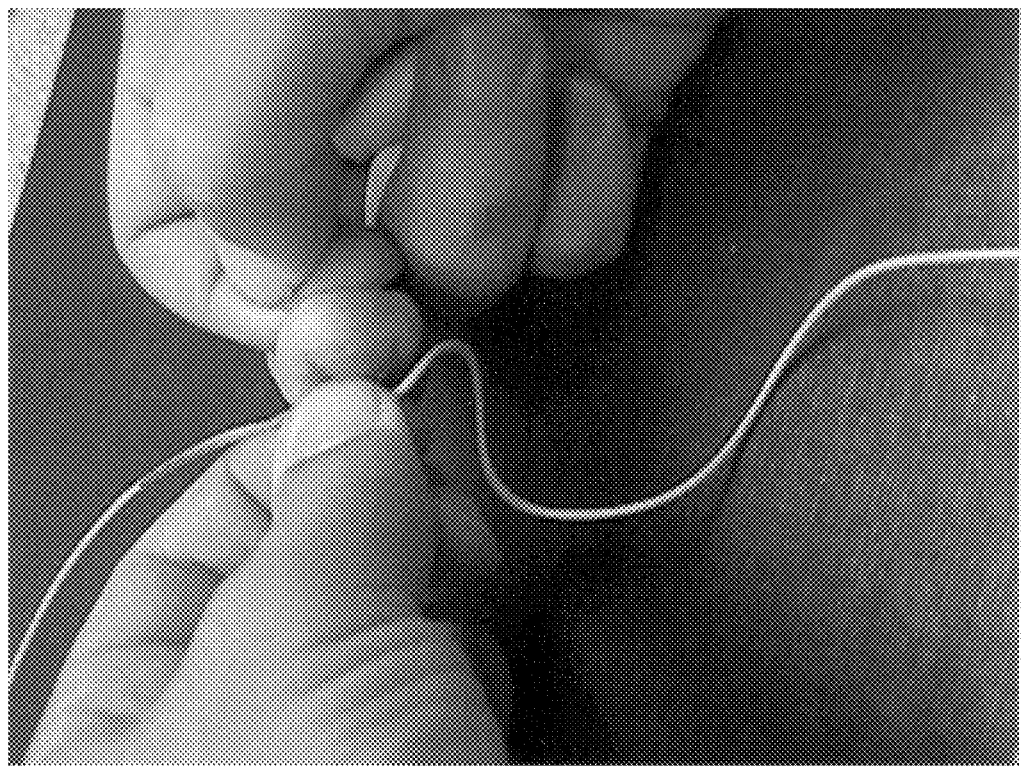
FIG. 1 illustrates buckling and deformation of a fiber bundle where the force to initiate a notch in the buffer tube with a ripcord is greater than the force to buckle the buffer tube.
Figure 2:
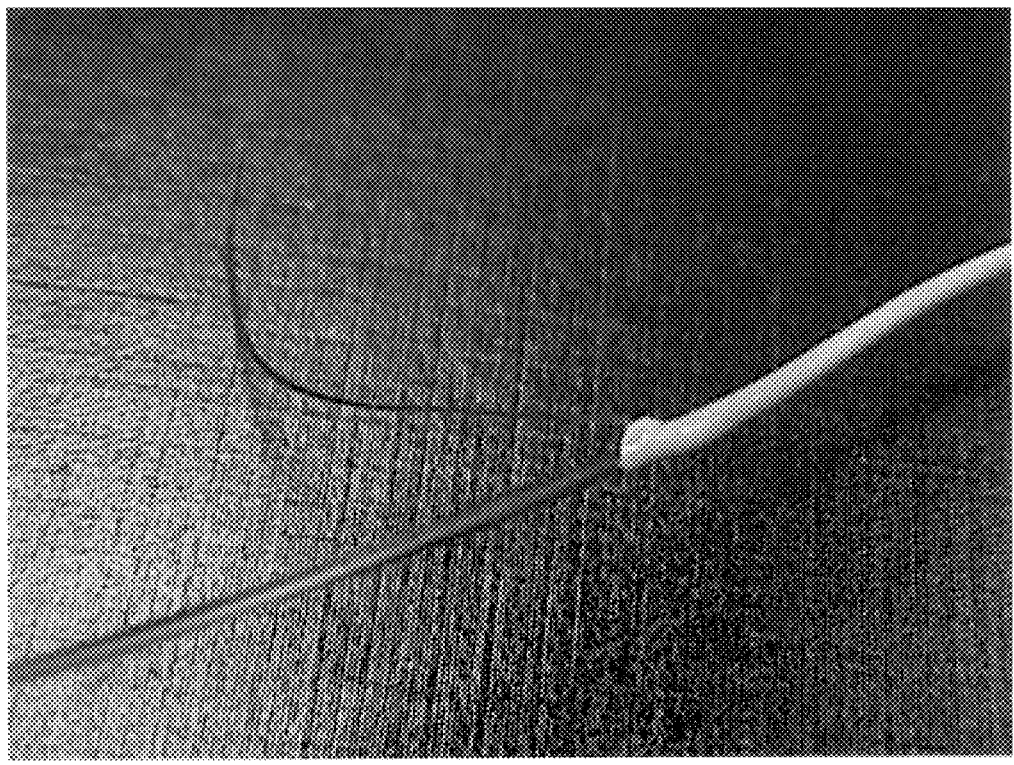
FIG. 2 illustrates a conventional buffer tube where the energy to break the buffer tube with a ripcord is greater than the energy to buckle the fiber bundle.
Figure 3:
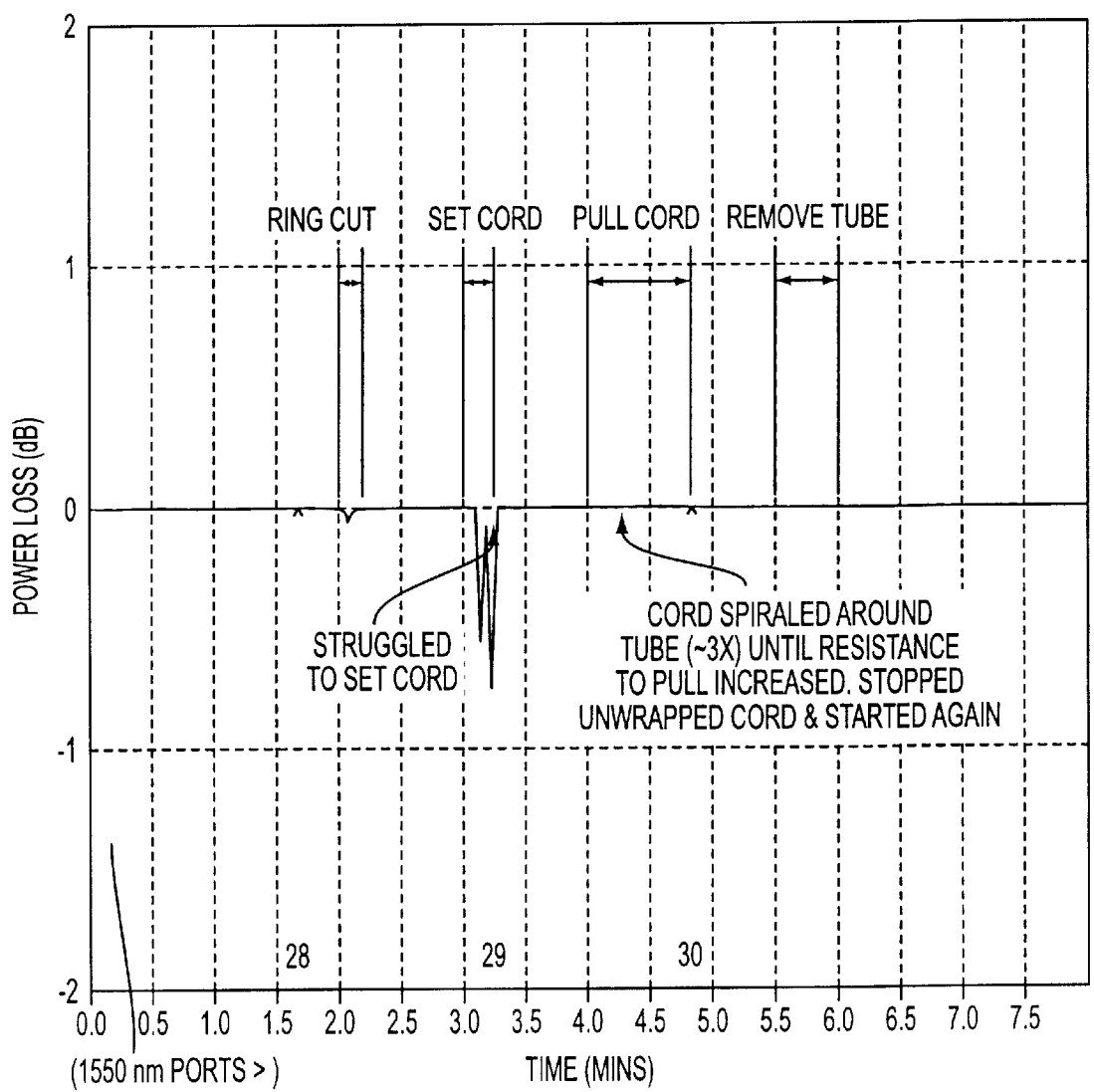
FIG. 3 shows the power loss in a signal during the buffer tube removal process of a conventional buffer tube.

FIGS. 1–3, as discussed above, characterize a situation where this fracture condition is not met. The buckling of the conventional PVC buffer tube results since the energy that is required to cause the buckling is less than the energy required to break the ripcord through the buffer tube. In the present invention, the energy required to break the ripcord through the buffer tube is less than the energy required to buckle the bundle. If the energy needed to start a tear in the buffer tube by a ripcord is increased by using a thicker material or a more durable material (having a higher fracture initiation energy), the energy needed to buckle the buffer tube may be increased by increasing the viscosity of a gel disposed within the buffer tube or by using a cross-linked gel in order to meet the fracture condition. Conversely, if the energy to buckle the fiber bundle is lowered by using fewer fibers or by using a lower viscosity gel, the energy needed to initiate a tear would have to be reduced by using a thinner buffer tube material or using a material with a lower fracture initiation energy.

Figure 6:
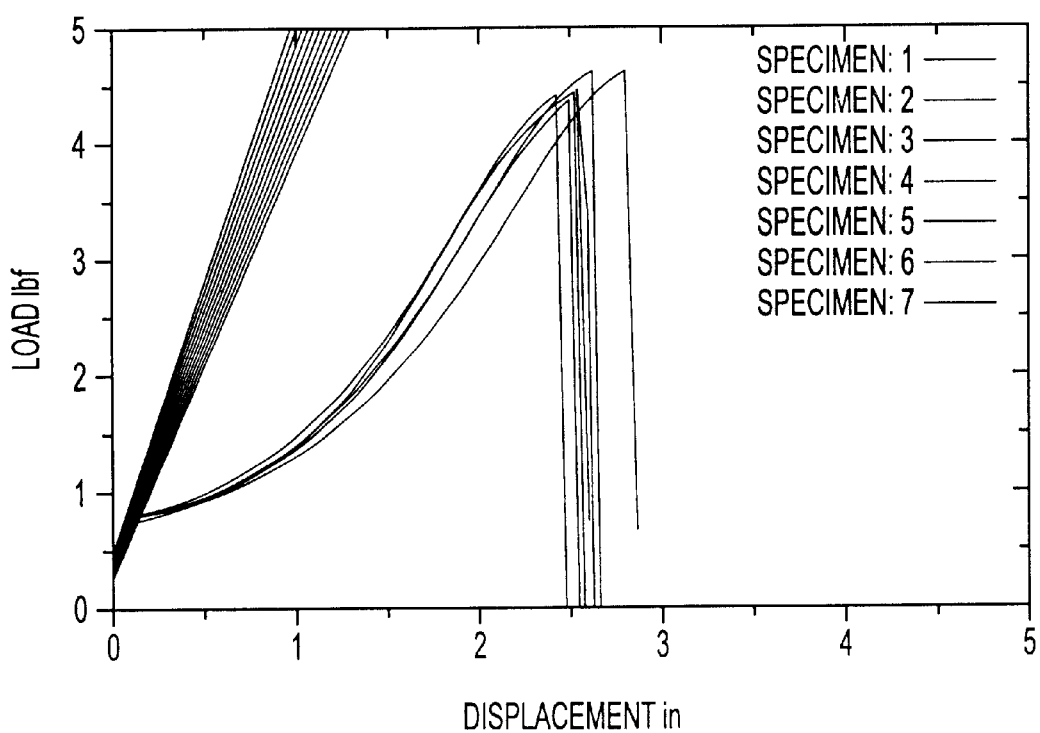
FIG. 6 is a graph showing the relationship between loading and displacement for a ripcord used in an embodiment of the present invention.

The ripcord should be selected to have a high energy to yield compared with the energy needed to rip the cord through the buffer tube. This ensures that the ripcord will not break during the course of pulling the ripcord through the buffer tube. The stress and energy characteristics for a ripcord according to a preferred embodiment are shown in Table 5. The corresponding load-displacement characteristics are shown in FIG. 6.

As an additional feature, the present buffer tube can be designed so that there are no special tools needed to open the tube. The tube has strong enough mechanical properties to hold the fiber bundle together, but can be easily torn using the fingers. This will more easily occur with materials that do not have a distinctive yield point and a high stress at break. Although, it can be obtained with materials that yield as long as they have a low elongation to break. Essentially, the energy to tear is proportional to the energy to break divided by the stress at break squared. Changing the material properties so that there is a low energy to break relative to the stress at break decreases the effort needed to tear the material. This will allow finger access through the buffer tubes and allow long lengths of the buffer tube to be easily removed for a midspan or end access.

The buffer tube material and thickness are such that the buffer tube can be peeled off from a fiber bundle with or without a ripcord filament. With the selection of material and thickness, pulling the tube laterally against a bundle of fibers is sufficient to cause the tube to split longitudinally. The use of a special cutting tool can also be obviated by selecting a material with a high coefficient of friction with skin, such that a ring cut in the buffer tube can be made by pulling the tube apart with the fingers. In addition, the tube material may have a high coefficient of friction with common materials such as rubber or paper, that is disposed against the buffer tube as a gripping layer to pull the tube apart with the fingers. Materials suitable for the buffer tube of the present invention include thermoplastics such as filled and blended polypropylene, polyolefins, EVA, EPA, PVC and ethyl acrylic acids.

Figure 7A:
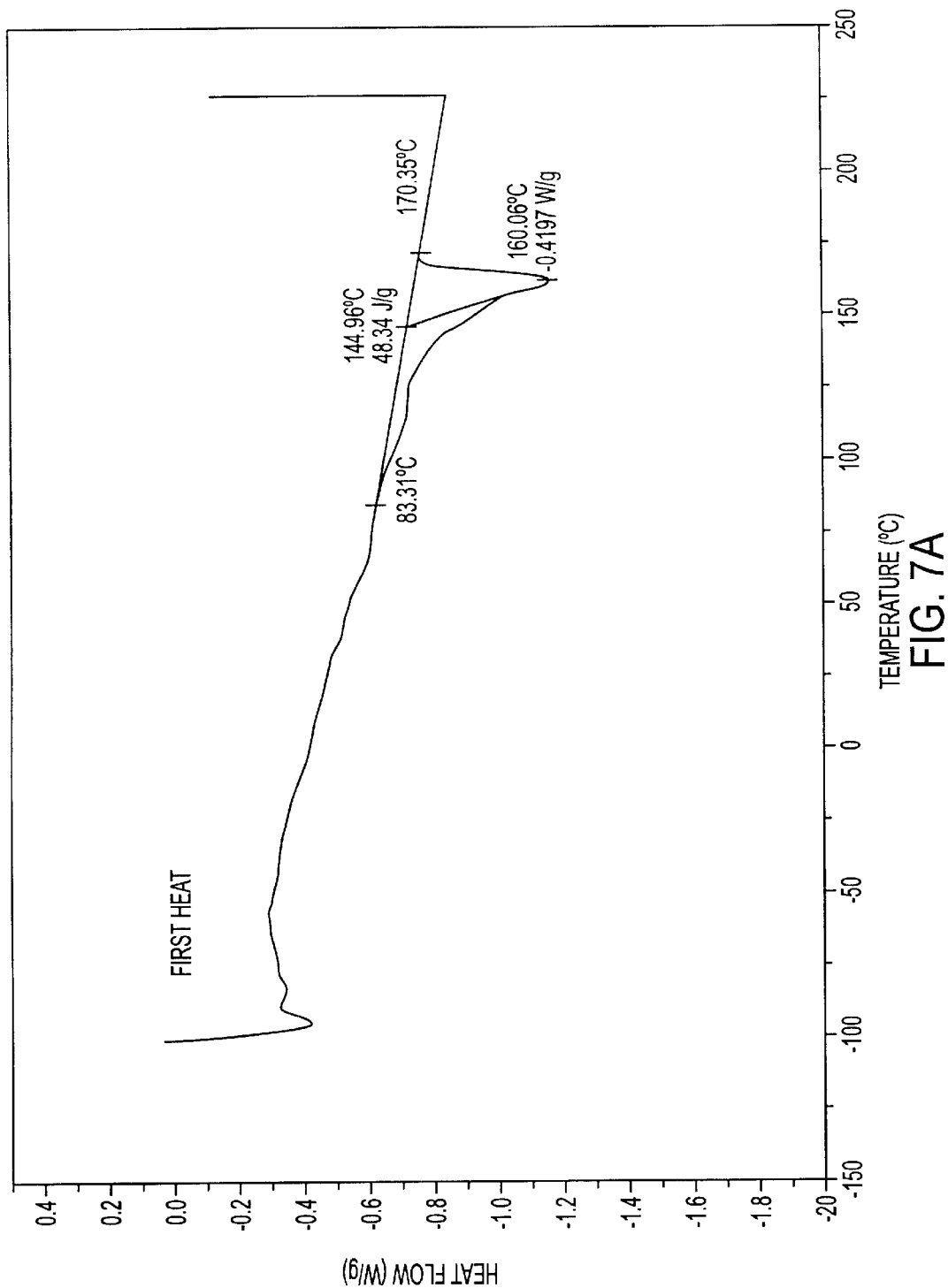
FIGS. 7(a)–7(b) illustrate the results of differential scanning calorimetry of a buffer tube material of an embodiment of the present invention during first and second heating.
Figure 7B:
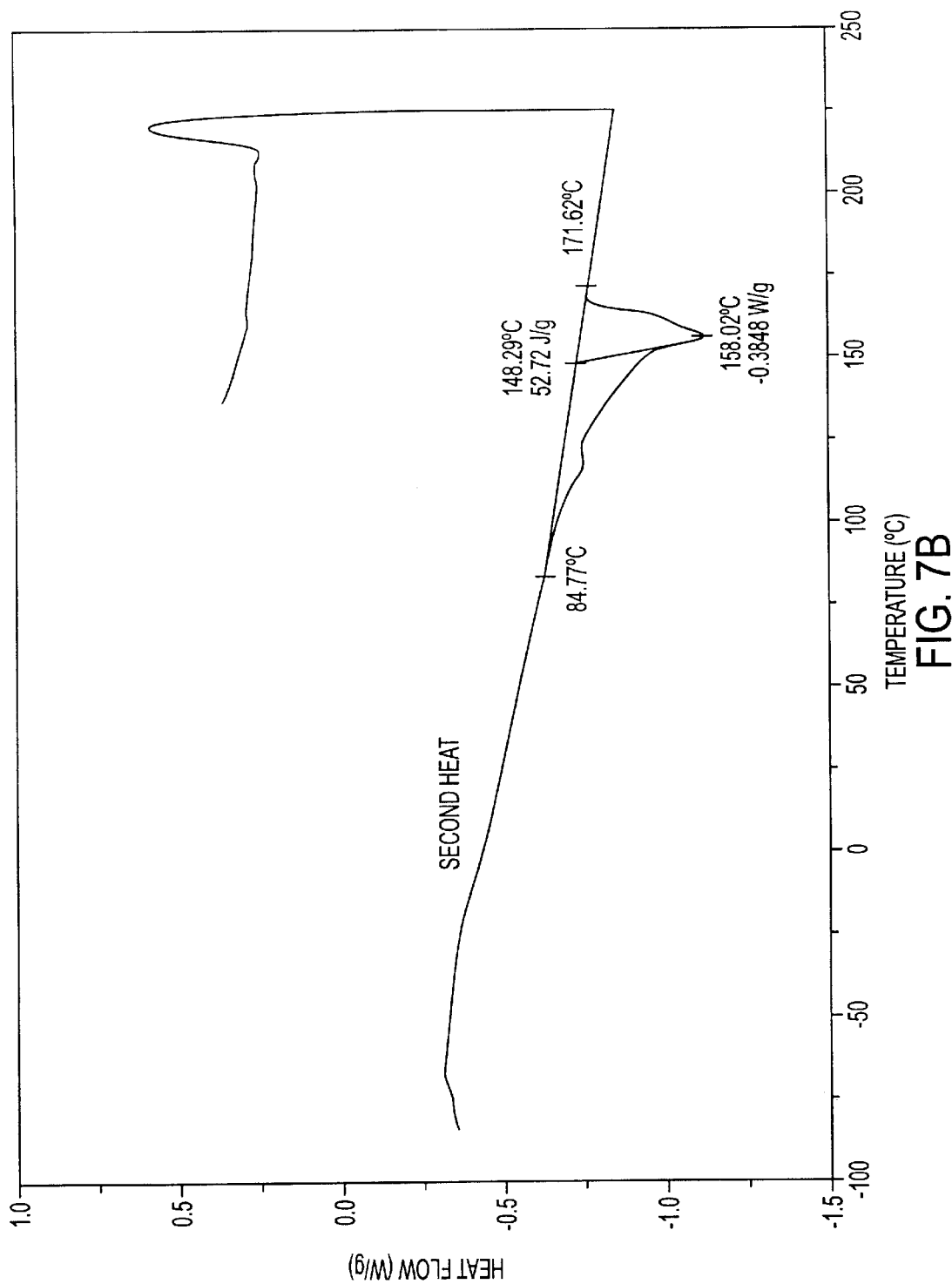

FIGS. 7(a)–7(b) illustrate empirical results for first and second heating of a buffer tube material according to the present invention. The data is shown for a material including a polyethylene and polypropylene copolymer blend. The troughs in the heat flow curve indicate the melting point of materials in the buffer tube. The second melting was performed after slow-cooling of the buffer tube material after the first heating.

Figure 9:
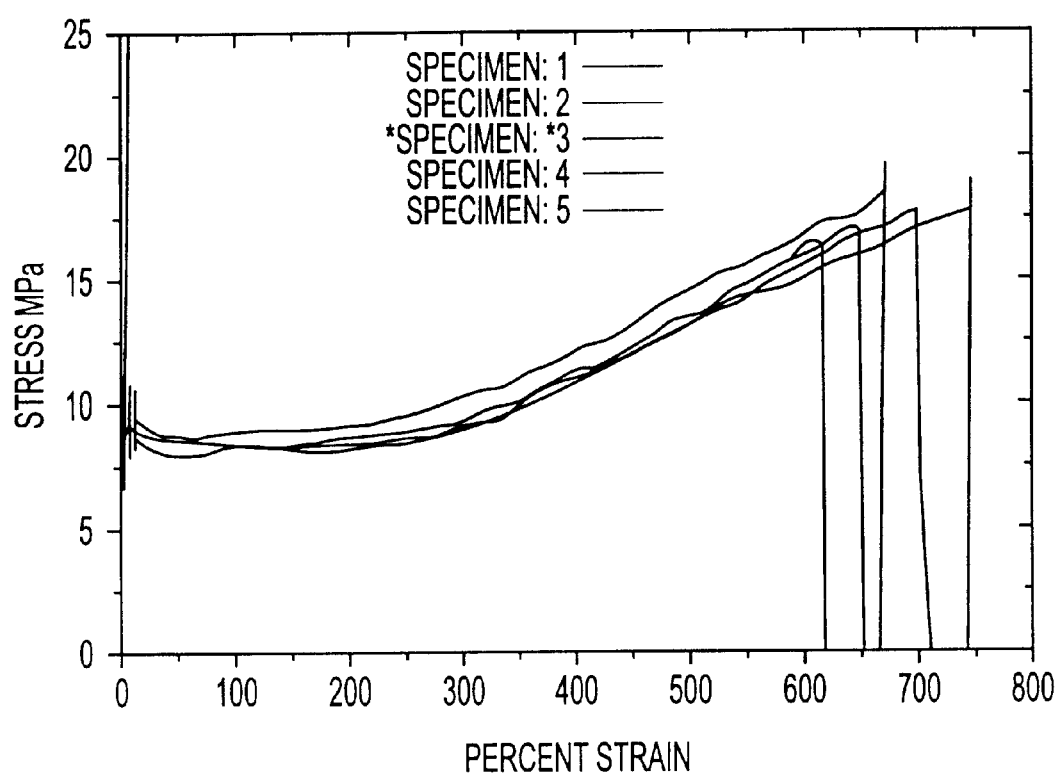
FIG. 9 is a graph showing the stress-strain relationship for a buffer tube material according to an embodiment of the present invention.

FIG. 8 shows the strain, energy and loading characteristics of the buffer tube material according to a preferred embodiment. FIG. 9 shows the corresponding stress-strain relationship.

In an embodiment where the buffer tube material is engineered to have finger access, the energy to break the material should be larger than the energy to needed to initiate and/or propagate a tear in the material. It is estimated that the energy to break should be less than 1 Joule for a buffer tube that has a 1.4 mm outside diameter and a 1.0 mm inside diameter tested at 1 inch gage length. This results in a normalized energy to break the material of 52,000 $kJ/m^3$.

Referring to FIG. 9, in an embodiment where no ripcord is used, the stress-strain curve will have a steeper characteristic. In particular, the curve will take on a parabolic shape in the region of a low percent strain (e.g. less than 100) and will peak in the vicinity of several hundred percent strain (e.g. 250 to 800). The energy to break can be ascertained from the area disposed beneath the stress-strain curve.

Figure 10:
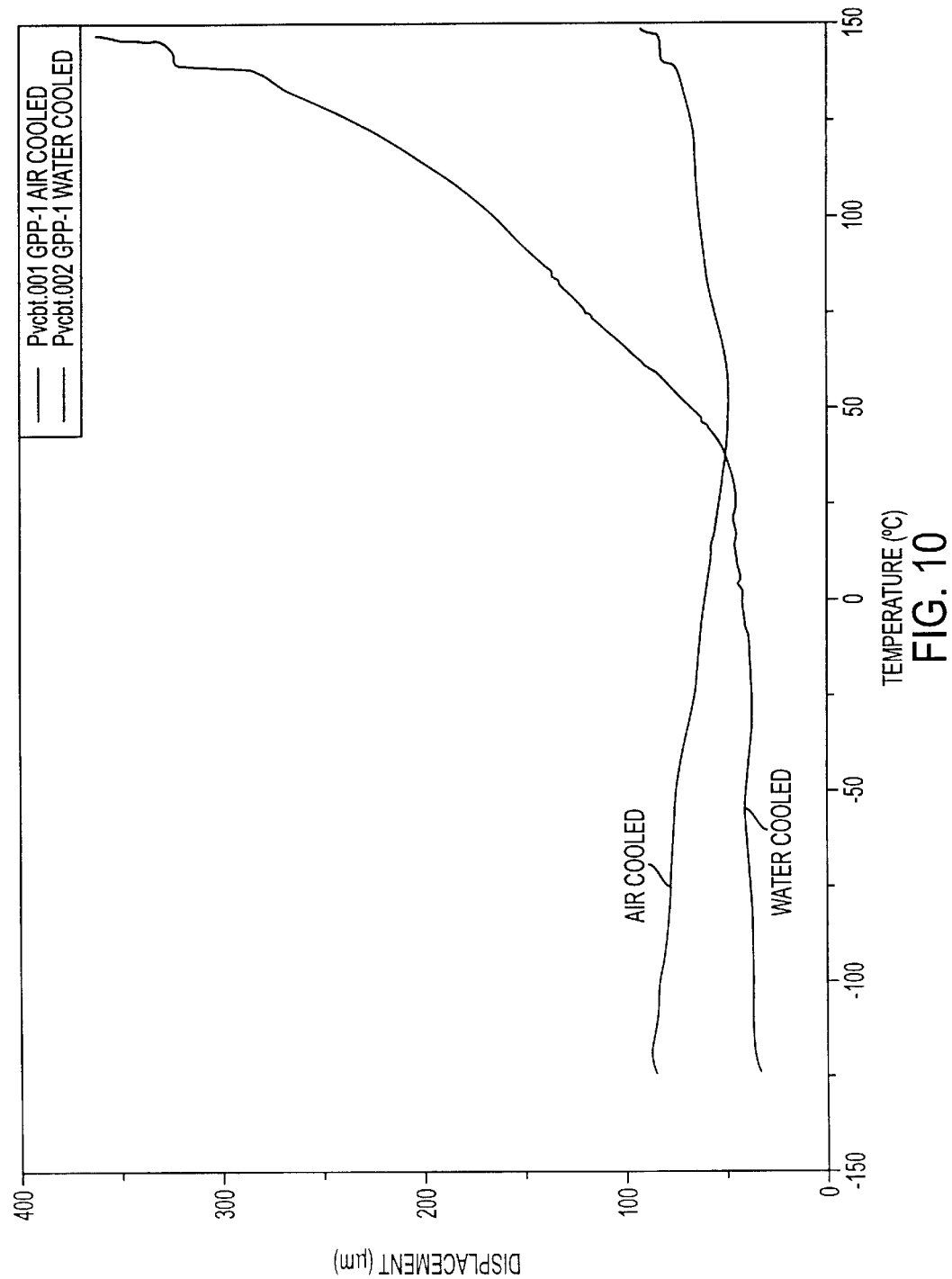
FIG. 10 is a graph showing the displacement as a function of temperature for buffer tubes according to an embodiment of the present invention.
Figure 11:
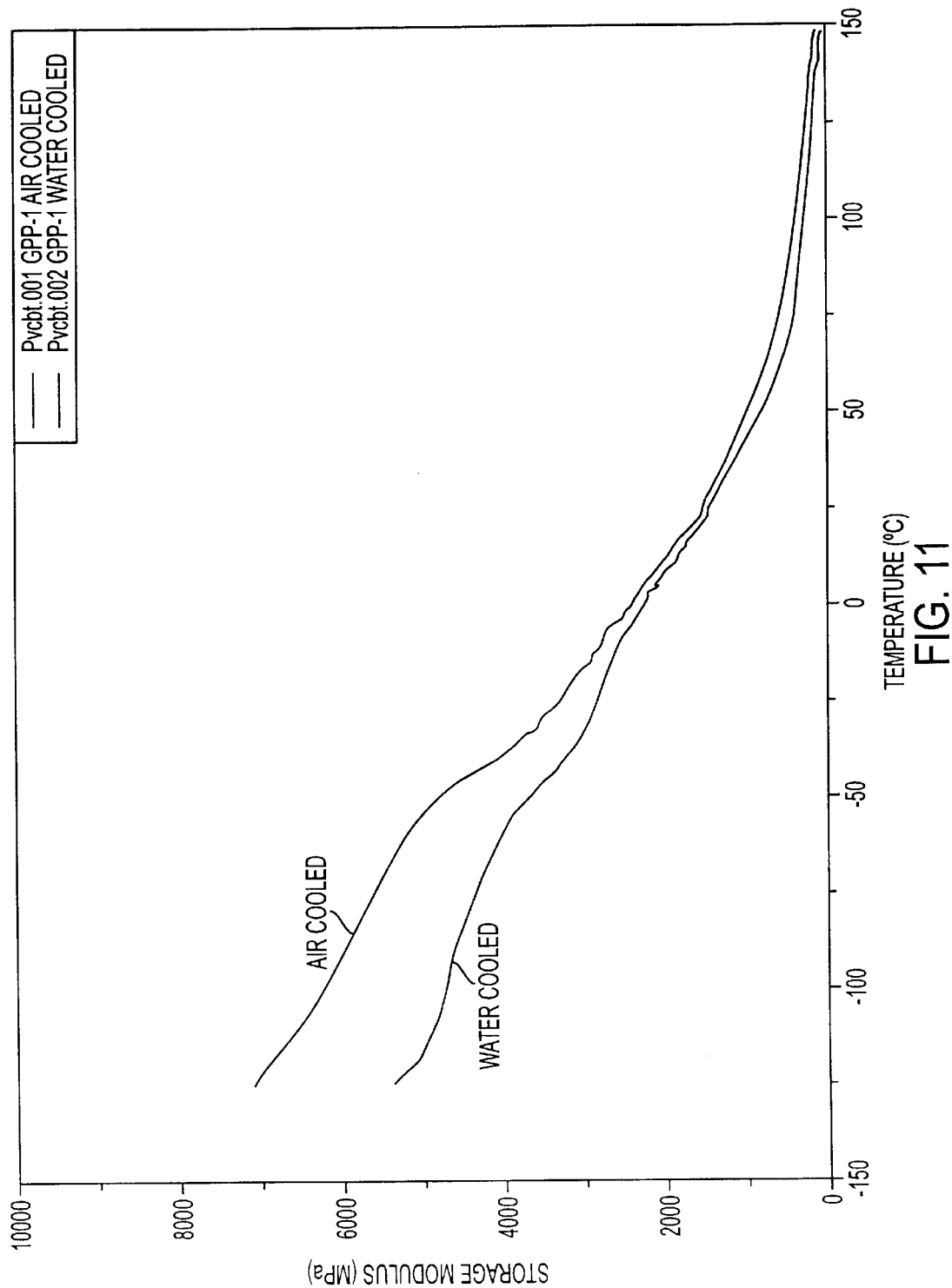
FIG. 11 is a graph showing the stress as a function of temperature for buffer tubes according to an embodiment of the present invention.

FIG. 10 illustrates one example of the dynamic mechanical properties of the buffer tube material formed under air cooled and water cooled conditions. In particular, FIG. 10 shows the displacement of the buffer tube material as a function of temperature. It is observed that the air-cooled material exhibits more crystallinity and hence more dimensional stability than the water cooled material. FIG. 11 illustrates the stress of the material as a function of temperature. Again, the air-cooled buffer tube material exhibits greater crystallinity than the water-cooled structure.

Figure 12A:
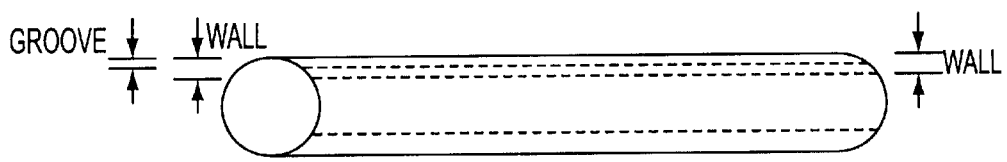
FIGS. 12(a)–12(c) illustrate another embodiment of the invention including stress risers.
Figures 1, 12A:
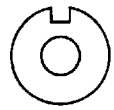
Figure 12B:
Figure 12C:

As an additional feature of the invention, grooves or indents are continuously or sequentially incorporated in to the buffer tubes as stress risers to allow easier access to optical fibers by reducing the energy needed to tear into the buffer tube. The stress risers can be formed on an inner or outer surface of the buffer tube. Because the grooves and indentations include less material than other portions of the tube, proper groove depth selection will force a controlled fracture zone. FIG. 12(a) shows a continuously formed groove along the longitudinal direction of the buffer tube. An exemplary cross-section of the buffer tube having the groove is shown in FIG. 12(a)(1). Applicants have observed that a V-shaped cross section provides better results than a blunt shaped groove. The depth of the groove(s) will depend upon the type of material used. Brittle materials need shallower grooves than an elastomer that may need grooves greater than half the wall thickness. FIG. 12(b) illustrates sequentially formed stress risers perpendicular to the direction of the lay of the optical fibers. For more rigid materials, it may be preferable to incorporate spiral grooves into the buffer tube so it can be bent or twisted to open the grooves, as shown in FIG. 12(c). Bending or twisting will generate shear along the groove lines and cause the seams to split. The spirals shaped grooves are more easily stressed than the longitudinal groove. The stress risers can be formed during buffer tube formation by using an appropriately molded die, or can be formed into the buffer tube after formation. The latter procedure would be especially applicable to more rigid materials. Abrading the exterior of the buffer tube with a material such as sandpaper is an additional technique that can be used to weaken the buffer tube. The tube will split along the abraded line when pulled laterally against the fiber bundle. Perforations may also be used to form the stress risers.

Figure 13:
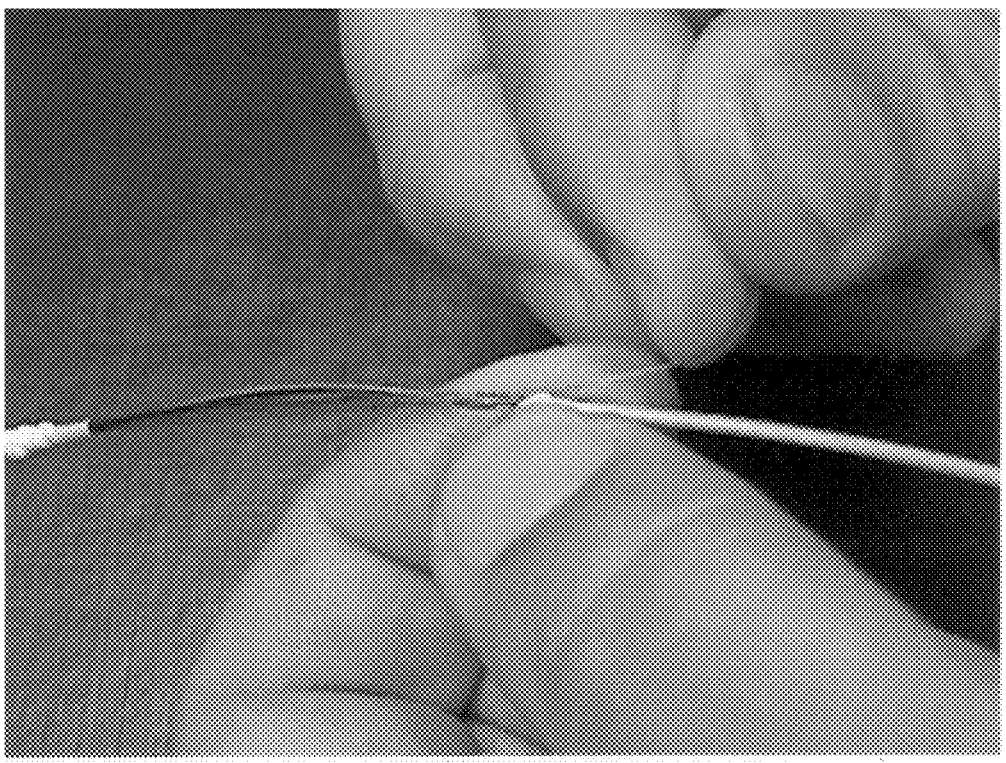
FIG. 13 illustrates initiation of a tear in a buffer tube according to an embodiment of the invention.
Figure 14:
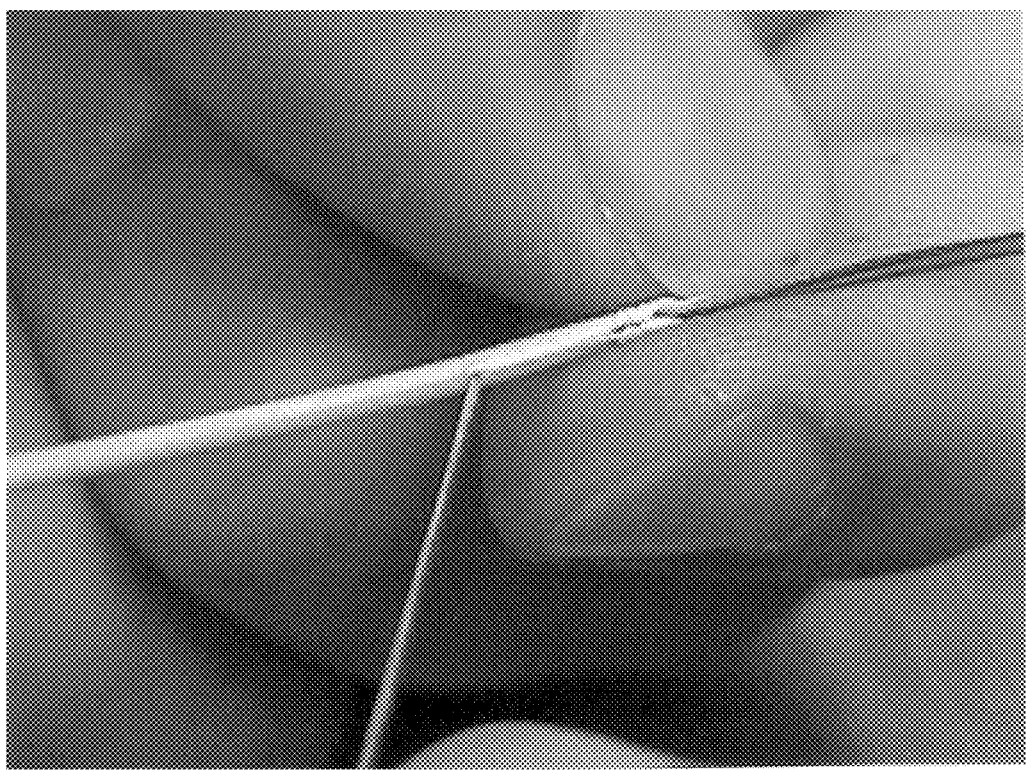
FIG. 14 illustrates use of a manually operated ripcord according to an embodiment of the invention.
Figure 15:
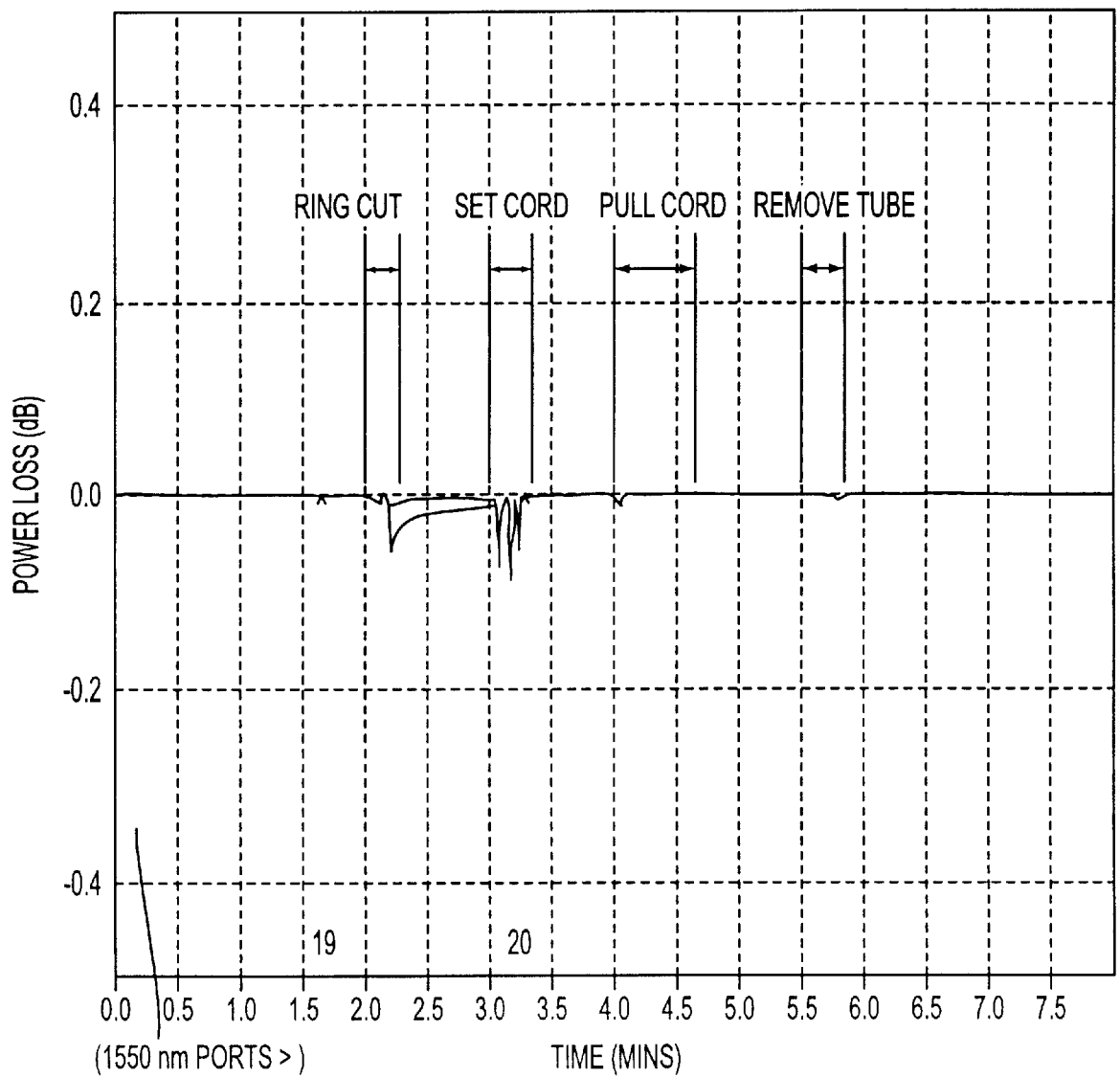
FIG. 15 shows the power loss characteristics for a signal carried on an optical cable disposed in a buffer tube according to an embodiment of the present invention.

The above buffer tube designs allow optical fibers to be accessed with the minimum amount of tools. The access techniques are selectively destructive to the buffer tube and not the fibers. FIG. 13 illustrates initiation of a tear in a buffer tube using manual manipulation according to embodiments of the invention. No special tools are required to initiate the tear in the buffer tube and gain access to the ripcord disposed therein. FIG. 14 illustrates tearing of the buffer tube using the ripcord in a buffer tube design of the invention. Compared to FIGS. 1–3 which included significant buckling and curling of the fiber bundle during the tearing process, FIG. 14 shows no significant deformation, thereby reducing the risk of fiber breakage or damage and reduced attenuation. FIG. 15 shows the power loss characteristics of a signal carried on a fiber disposed within a buffer tube system of the present invention. Compared with FIG. 3, signal attenuation is significantly reduced. Therefore, it is clear that the present invention results in the least amount of attenuation to the buffer tube during the opening and tearing process without the risk of mechanically damaging the fibers that a knife type tool may present or which may occur when fracture energies are not properly taken into account. While the invention has been discussed in terms of specific preferred embodiments, the invention is not limited thereto. One skilled in the art would understand that modifications can be made to provide alternative buffer tube designs that do not depart from the spirit and scope of the present invention. Moreover, one skilled in the art would understand how to make the buffer tubes and how to implement buffer tube removal using various techniques based on the above disclosure.

What is claimed:

1. A buffer tube having a fiber bundle comprising one or more optical fibers disposed therein, said buffer tube having an energy to break threshold which is less than an energy necessary to deform the fiber bundle.

2. The buffer tube of claim 1, wherein a ripcord is disposed interior to the buffer tube.

3. The buffer tube of claim 2, wherein said ripcord has an energy to yield that is greater than an energy required to rip said ripcord through the buffer tube.

4. The buffer tube of claim 3, wherein said ripcord is color coded to distinguish it from the fiber bundle.

5. The buffer tube of claim 3, wherein said buffer tube is comprised with stress risers formed in a wall of said buffer tube.

6. The buffer tube of claim 5, wherein said ripcord is color coded to distinguish it from the fiber bundle.

7. The buffer tube of claim 5, wherein said stress risers include a groove also inventably formed on an inner surface of said wall of said buffer tube.

8. The buffer tube of claim 5, wherein said stress risers are formed on an outer surface of said wall of said buffer tube.

9. The buffer tube of claim 7, wherein said groove has a "V" shape.

10. The buffer tube of claim 5, wherein said stress risers are formed in a longitudinal direction of said buffer tube.

11. The buffer tube of claim 5, wherein said stress risers are formed in a perpendicular direction of said buffer tube.

12. The buffer tube of claim 5, wherein said stress risers are in a spiral form around said buffer tube.

13. The buffer tube of claim 1, wherein said buffer tube is comprised with stress risers formed in a wall of said buffer tube.

14. The buffer tube of claim 13, wherein said stress risers include a groove also inventably formed on an inner surface of said wall of said buffer tube.

15. The buffer tube of claim 13, wherein said stress risers are formed on an outer surface of said wall of said buffer tube.

16. The buffer tube of claim 14, wherein said groove has a "V" shape.

17. The buffer tube of claim 13, wherein said stress risers are formed in a longitudinal direction of said buffer tube.

18. The buffer tube of claim 13, wherein said stress risers are formed in a perpendicular direction of said buffer tube.

19. The buffer tube of claim 13, wherein said stress risers are in a spiral form around said buffer tube.

20. A buffer tube having a fiber bundle comprising one or more optical fibers disposed therein, said buffer tube further comprising a ripcord disposed interior to said buffer tube having an energy to yield that is greater than an energy required to rip said ripcord through said buffer tube.

21. The buffer tube of claim 20, wherein said ripcord is color coded to distinguish it from the fiber bundle.

22. The buffer tube of claim 20, wherein said stress risers include a groove formed on an inner surface of said wall of said buffer tube.

23. The buffer tube of claim 20, wherein said stress risers are formed on an outer surface of said wall of said buffer tube.

24. The buffer tube of claim 22, wherein said groove has a "V" shape.

25. The buffer tube of claim 20, wherein said stress risers are formed in a longitudinal direction of said buffer tube.

26. The buffer tube of claim 20, wherein said stress risers are formed in a perpendicular direction of said buffer tube.

27. The buffer tube of claim 20, wherein said stress risers are in a spiral form around said buffer tube.

28. A buffer tube having a fiber bundle comprising one or more optical fibers disposed therein, said buffer tube further comprising stress risers formed in a wall of said buffer tube.

29. The buffer tube of claim 28, wherein said stress risers include a groove also inventably formed on an inner surface of said wall of said buffer tube.

30. The buffer tube of claim 28, wherein said stress risers are formed on an outer surface of said wall of said buffer tube.

31. The buffer tube of claim 29, wherein said groove has a "V" shape.

32. The buffer tube of claim 28, wherein said stress risers are formed in a longitudinal direction of said buffer tube.

33. The buffer tube of claim 28, wherein said stress risers are formed in a perpendicular direction of said buffer tube.

34. The buffer tube of claim 28, wherein said stress risers are in a spiral form around said buffer tube.

35. A telecommunications cable, comprising:
   an outer retaining member having stress risers formed therein; and
   at least one optical fiber disposed in said outer retaining member.

36. The telecommunications cable of claim 35, wherein a ripcord is disposed interior to an inner surface of said outer retaining member, said ripcord having an energy to yield that is greater than an energy required to rip said ripcord through said outer retaining member.

37. The telecommunications cable of claim 36, wherein said ripcord is color coded to distinguish it from said at least one optical fiber.

38. The telecommunications cable of claim 35, wherein said stress risers include a groove formed on an inner surface of said outer retaining member.

39. The telecommunications cable of claim 35, wherein said stress risers include a groove formed on an outer surface of said outer retaining member.

40. The telecommunications cable of claim 38, wherein said groove has a "V" shape.

41. The telecommunications cable of claim 39, wherein said groove has a "V" shape.

42. The telecommunications cable of claim 35, wherein said stress risers are formed in a longitudinal direction of said telecommunications cable.

43. The telecommunications cable of claim 35, wherein said stress risers are formed in a perpendicular direction of said telecommunications cable.

44. The telecommunications cable of claim 35, wherein said stress risers are in a spiral form around said outer retaining member.

45. The telecommunications cable of claim 35, wherein a ripcord is embedded within said outer retaining member, said ripcord having an energy to yield that is greater than an energy required to rip said ripcord through said outer retaining member.

46. The telecommunications cable of claim 45, wherein said ripcord is color coded to distinguish it from said at least one optical fiber.

* * * * *